(12) United States Patent
Schaefer et al.

(10) Patent No.: US 11,484,038 B2
(45) Date of Patent: Nov. 1, 2022

(54) RESPIRATION RANKING IN CONTROLLED ATMOSPHERE ROOMS

(71) Applicant: Storage Control Systems, Inc., Sparta, MI (US)

(72) Inventors: James C. Schaefer, Rockford, MI (US); Daniel E. Boozer, Rockford, MI (US)

(73) Assignee: Storage Control Systems, Inc., Sparta, MI (US)

( * ) Notice: Subject to any disclaimer, the term of this patent is extended or adjusted under 35 U.S.C. 154(b) by 605 days.

(21) Appl. No.: 16/161,155

(22) Filed: Oct. 16, 2018

(65) Prior Publication Data

US 2020/0113199 A1   Apr. 16, 2020

(51) Int. Cl.
 *A23B 7/148* (2006.01)
 *A23L 3/3418* (2006.01)

(52) U.S. Cl.
 CPC ............ *A23B 7/148* (2013.01); *A23L 3/3418* (2013.01); *A23V 2002/00* (2013.01)

(58) Field of Classification Search
 CPC .............................. A23B 7/148; A23L 3/3418
 See application file for complete search history.

(56) References Cited

U.S. PATENT DOCUMENTS

| | | |
|---|---|---|
| 3,817,452 A | 6/1974 | Dean, Jr. |
| 4,817,391 A | 4/1989 | Roe et al. |
| 5,575,714 A | 11/1996 | Rijs |
| 5,791,236 A | 8/1998 | Schouten |
| 5,799,495 A | 9/1998 | Gast, Jr. et al. |
| 5,899,084 A | 5/1999 | Franaszek et al. |
| 6,012,384 A | 1/2000 | Badalament et al. |
| 6,256,905 B1 | 7/2001 | White |
| 6,658,994 B1 * | 12/2003 | McMillan ............. A23L 3/3418 219/214 |
| 8,122,738 B2 | 2/2012 | Saul |
| 8,739,694 B2 | 6/2014 | Schaefer et al. |
| 8,808,776 B2 | 8/2014 | North |
| 2004/0107711 A1 | 6/2004 | Sastry |
| 2005/0235658 A1 | 10/2005 | Fleming, Jr. et al. |
| 2007/0144638 A1 | 6/2007 | Fernandez et al. |
| 2012/0096802 A1 | 4/2012 | Davenport |

(Continued)

FOREIGN PATENT DOCUMENTS

WO   2011113915 A1   9/2011

OTHER PUBLICATIONS

United Kingdom search report conducted on Mar. 18, 2020 in corresponding U.K Patent Application No. GB1913687.8.

*Primary Examiner* — Stephanie A Cox
(74) *Attorney, Agent, or Firm* — Warner Norcross + Judd LLP

(57) ABSTRACT

An improved system and method for evaluating stored agricultural or horticultural commodities is provided. The system and method generally include performing atmospheric measurements within multiple controlled atmosphere rooms, or sampling enclosures coupled to controlled atmosphere rooms, and determining a change over time of a respiratory value of the commodities stored therein. Based on the change over time of the respiratory value, the system and method selects commodities from among at least one of the controlled atmosphere rooms for delivery, marketing, storage, or other disposition.

7 Claims, 4 Drawing Sheets

(56) References Cited

U.S. PATENT DOCUMENTS

| | | | |
|---|---|---|---|
| 2012/0097050 A1* | 4/2012 | Schaefer | A23B 7/144 |
| | | | 99/468 |
| 2012/0125472 A1 | 5/2012 | Pinkalla | |
| 2014/0208795 A1 | 7/2014 | Bell | |
| 2014/0254090 A1 | 9/2014 | Gardner | |
| 2014/0308409 A1* | 10/2014 | Savur | A23L 3/3418 |
| | | | 426/118 |
| 2015/0017296 A1 | 1/2015 | Veltman | |
| 2015/0192318 A1 | 7/2015 | Heim | |

* cited by examiner

RESPIRATION RANKING IN CONTROLLED ATMOSPHERE ROOMS

FIELD OF THE INVENTION

The present invention relates to systems and methods for evaluating perishable commodities in controlled atmosphere rooms based on detected changes in respiration.

BACKGROUND OF THE INVENTION

Perishable commodities, such as apples and pears, are frequently stored in controlled atmosphere rooms. By maintaining a regulated atmosphere with a lowered oxygen content, controlled atmosphere rooms delay the ripening of these and other agricultural and horticultural commodities. The impact of oxygen content is significant because commodities naturally consume oxygen from the atmosphere and use it to convert complex molecules, for example glucose, and release carbon dioxide. A reduced oxygen content of less than 2% for apples, for example, has been found to greatly extend storage life without using chemical agents.

At especially low oxygen concentrations, however, commodities begin to undergo fermentation. During fermentation, alcohol is also produced, and the commodity becomes unsaleable. To guard against fermentation, it is known to measure the ratio of carbon dioxide produced relative to oxygen consumed, termed a "respiratory quotient." The respiratory quotient sharply increases at the onset of fermentation. When this increase is detected, the reduction of oxygen in the controlled atmosphere room can be halted or reversed to reach the optimum lowest level of oxygen for delaying ripening without triggering fermentation.

While it is known to measure the respiratory quotient of commodities in controlled atmosphere rooms, there remains a continued need for intelligent systems and methods that use the respiratory quotient and other data to improve the evaluation and selection of commodities for sale to customers.

SUMMARY OF THE INVENTION

An improved system and method for evaluating stored agricultural or horticultural commodities is provided. The system and method generally include performing atmospheric measurements within multiple controlled atmosphere rooms, or sampling enclosures coupled to controlled atmosphere rooms, and determining a change over time of a respiratory value of the commodities stored therein. Based on the change over time of the respiratory value, the system and method selects commodities from among at least one of the controlled atmosphere rooms for delivery, marketing, storage, or other disposition, optionally based on a customer's criteria.

In one embodiment, the system includes a plurality of controlled atmosphere rooms, each storing a bulk quantity of commodities therein. The system also includes sampling enclosures for previewing atmospheric changes. A control system performs a plurality of successive atmospheric measurements over time, for example oxygen concentration measurements and carbon dioxide concentration measurements. The control system determines a change over time of a respiratory value, the respiratory value being at least partially based on the respiration of the commodities stored in the sampling enclosures. The respiratory value is the respiratory quotient in one embodiment, but can be other values in other embodiments.

The control system then selects commodities from at least one of the controlled atmosphere rooms based on the change over time of the respiratory value. This operation can include accessing a customer criteria for bulk commodities and ranking the bulk commodities based on a measure of conformance with the customer criteria. The bulk commodities having the desired measure of conformance with the customer criteria are then designated for delivery, marketing, storage, or other disposition over bulk commodities having a lower measure of conformance with the customer criteria. The control system can be implemented as an automated system that detects changes in the respiratory quotient over time, as one example of a respiratory value, to improve the evaluation and selection of commodities for customers.

These and other features and advantages of the present invention will become apparent from the following description of the invention, when viewed in accordance with the accompanying drawings and appended claims.

DETAILED DESCRIPTION OF THE CURRENT EMBODIMENT

Figure 1:
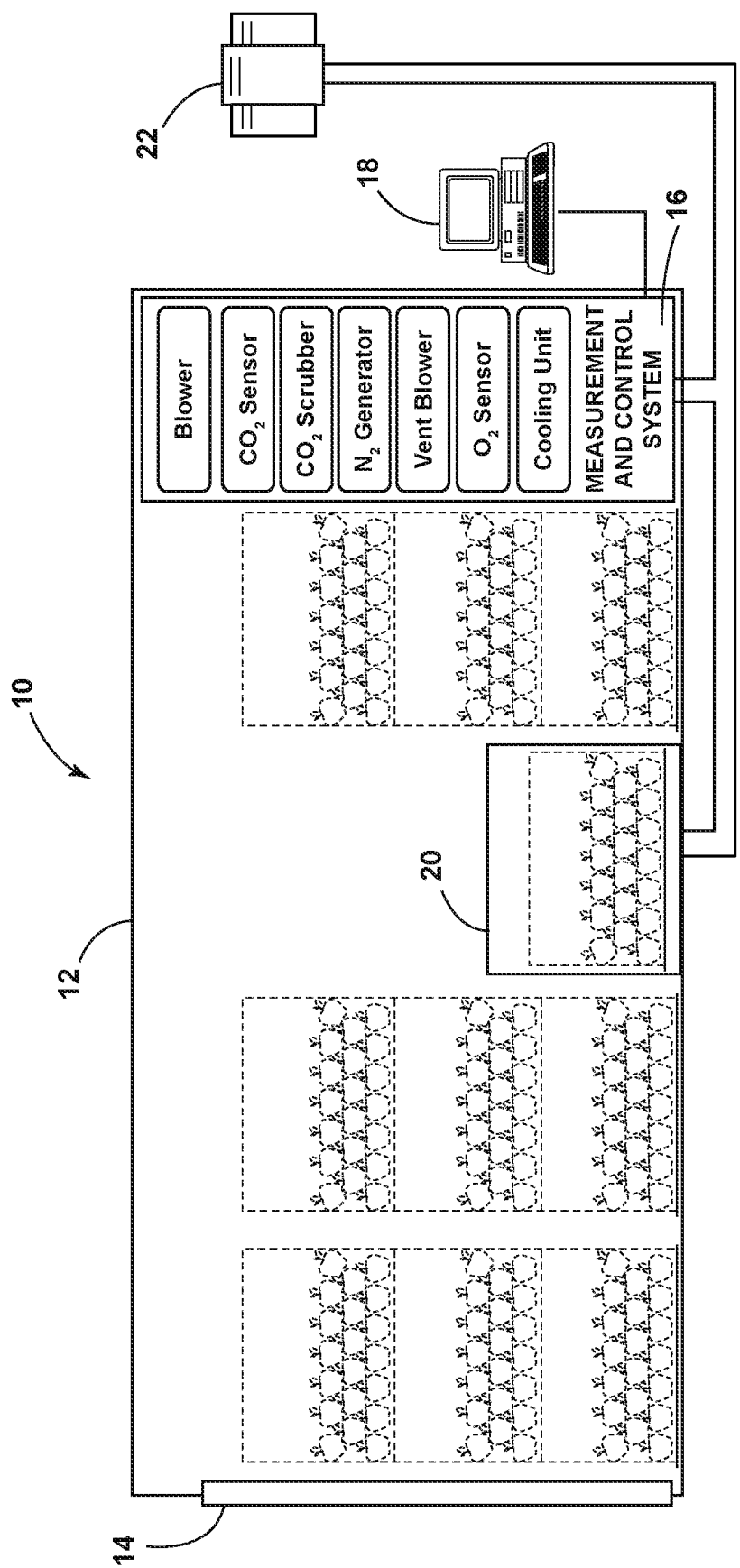
FIG. 1 is an illustration of a controlled atmosphere room in accordance with one embodiment.

A controlled atmosphere room in accordance with one embodiment is illustrated in FIG. 1 and generally designated 10. The controlled atmosphere room 10 includes an enclosure 12 that is suitable for the storage of agricultural or horticultural commodities. The enclosure 12 includes a door 14 to create a hermetic seal. The controlled atmosphere room 10 also includes a measurement and control system 16 (hereinafter "control system 16") adapted to control the atmosphere within the enclosure 12. In the illustrated embodiment, the control system 16 is adapted to adjust the partial pressure of oxygen, carbon dioxide, and nitrogen in the enclosure, while also regulating the temperature within the enclosure. The control system 16 can also include a vent blower, a carbon dioxide scrubber, a nitrogen generator, a cooling unit, and a blower. The control system 16 is connected to an input/output device, for example a workstation or a tablet 18. The control system 16 is computer-controlled, and includes for example the system disclosed in U.S. Pat. No. 8,551,215 to Schaefer, the contents of which are incorporated by reference in their entirety.

In operation, the control system 16 functions to reduce the content of oxygen within the enclosure 12 to delay the ripening of the commodities stored therein. To do so, the control system 16 displaces oxygen with nitrogen from the nitrogen generator when the oxygen level is higher than required (and increases oxygen with the vent blower when the oxygen level is lower than required). The carbon dioxide scrubber regulates the amount of carbon dioxide within the controller, the carbon dioxide resulting from respiration of the commodities stored within the enclosure 10, while the cooling unit maintains the desired temperature within the enclosure. The optimum oxygen level, carbon dioxide level, and temperature level are specific to the commodities stored within the enclosure 12. For example, the optimum oxygen level is generally lower for apples than for pears. The control system 16 can additionally maintain oxygen and carbon dioxide levels in the room. These rooms, being tested and held to an air-tight standard, prevent the introduction of ambient air (with an oxygen content of about 21%) into the enclosure 12.

As also depicted in FIG. 1, the controlled atmosphere room 10 includes a sampling enclosure 20. The sampling enclosure 20 is adapted to preview the effects of changes in oxygen levels on respiration and is also adapted to provide more accurate monitoring of the respiration (oxygen consumed and carbon dioxide generation) of the sample lot stored therein. The sampling enclosure 20 can be as described in U.S. Pat. No. 8,739,694 to Schaefer, the disclosure of which is incorporated by reference in its entirety, also available commercially as the SAFEPOD SYSTEM by Storage Control Systems, Inc. of Sparta, Mich. For example, the sampling enclosure 20 is also coupled to the control system 16. In use, the sampling enclosure 20 is ordinarily maintained in atmospheric communication with the controlled atmosphere room 10 so that the sample lot shares the environmental conditions with the commodities in the controlled atmosphere room 10. At select times, the sampling enclosure 20 is isolated from the controlled atmosphere room 10 and changes in gas concentration levels are previewed on the sample lot. Once testing is completed, the sampling enclosure 20 can be brought into atmospheric communication with the controlled atmosphere room 10 in the manner set forth in U.S. Pat. No. 8,739,694 to Schaefer. Though illustrated as being contained within the controlled atmosphere room 10, the sampling enclosure 20 may also be positioned external to the controlled atmosphere room 10 while remaining in fluid communication with each other.

In the current embodiment, the controlled atmosphere room 10 is one room among a series of rooms of a storage facility. Each controlled atmosphere room includes its own enclosure containing commodities stored therein. Similar to the controlled atmosphere room 10 depicted in FIG. 1, the remaining controlled atmosphere rooms include a control system and a sampling enclosure, which as noted above may be within or external to the respective controlled atmosphere rooms. The control systems are each adapted to measure changes in a respiratory value over time, and, based on these measurements, a central controller 22 prioritizes the sale and shipment of the commodities from among the various controlled atmosphere rooms.

For purposes of this disclosure, a "respiratory value" means a value relating to the respiration of an agricultural or horticultural commodity. Examples include the oxygen concentration within the sampling enclosure or the controlled atmosphere room, the time rate of change of the oxygen concentration, the carbon dioxide concentration within the sampling enclosure or the controlled atmosphere room, the time rate of change of the carbon dioxide concentration, the oxygen consumed by the commodity under observation, the time rate of change of the oxygen consumed, the amount of oxygen consumed over time, the carbon dioxide produced by the commodity under observation, the time rate of change of the carbon dioxide produced, the amount of carbon dioxide produced over time, the respiratory quotient of the commodity under observation, the time rate of change of the respiratory quotient, the respiration rate of the commodity under observation (the amount of carbon dioxide produced per unit mass per unit time, optionally in units of ml $CO_2$ $kg^{-1}$ $hour^{-1}$), and the rate of change of the respiration rate of the commodity under observation.

Figure 2:
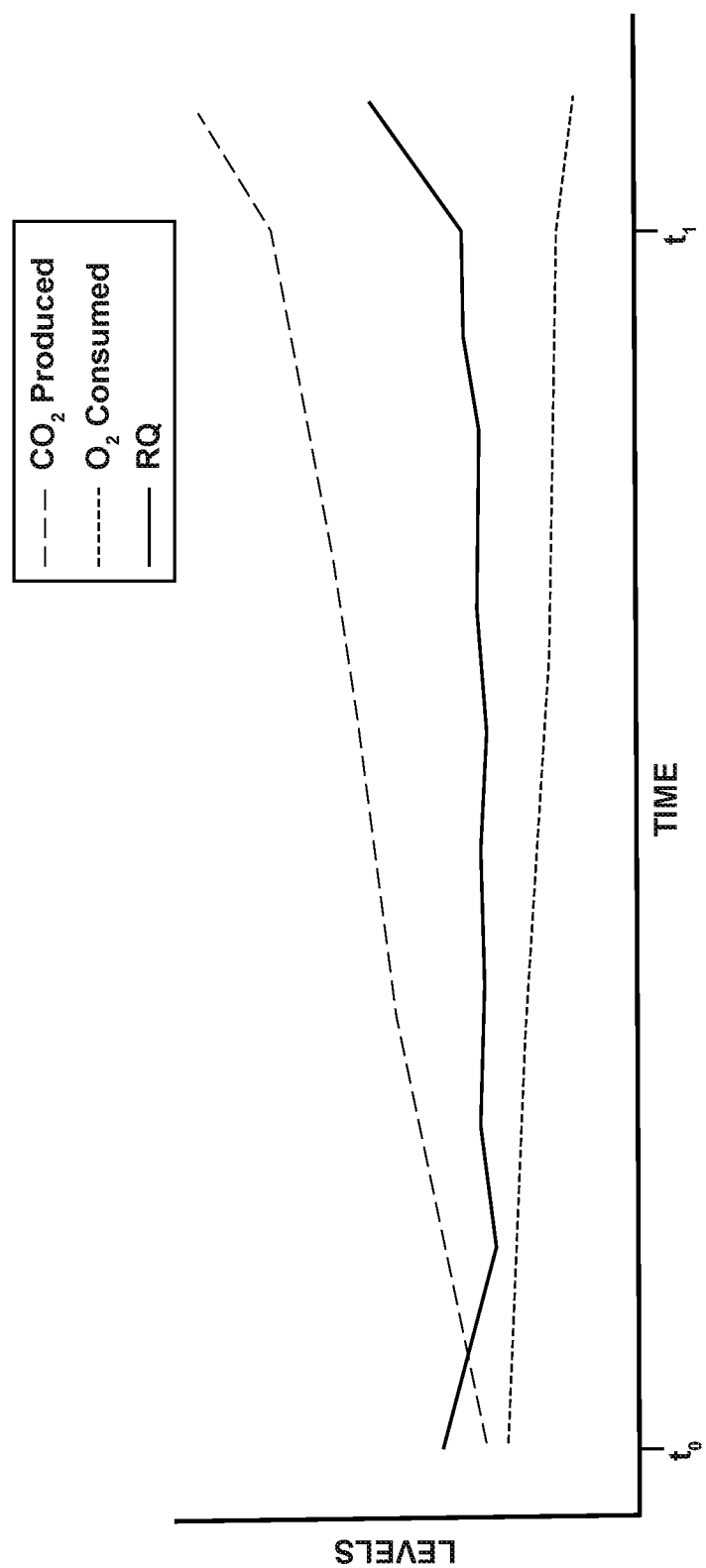
FIG. 2 is a graph of respiratory values over time for a controlled atmosphere room.
Figure 3:
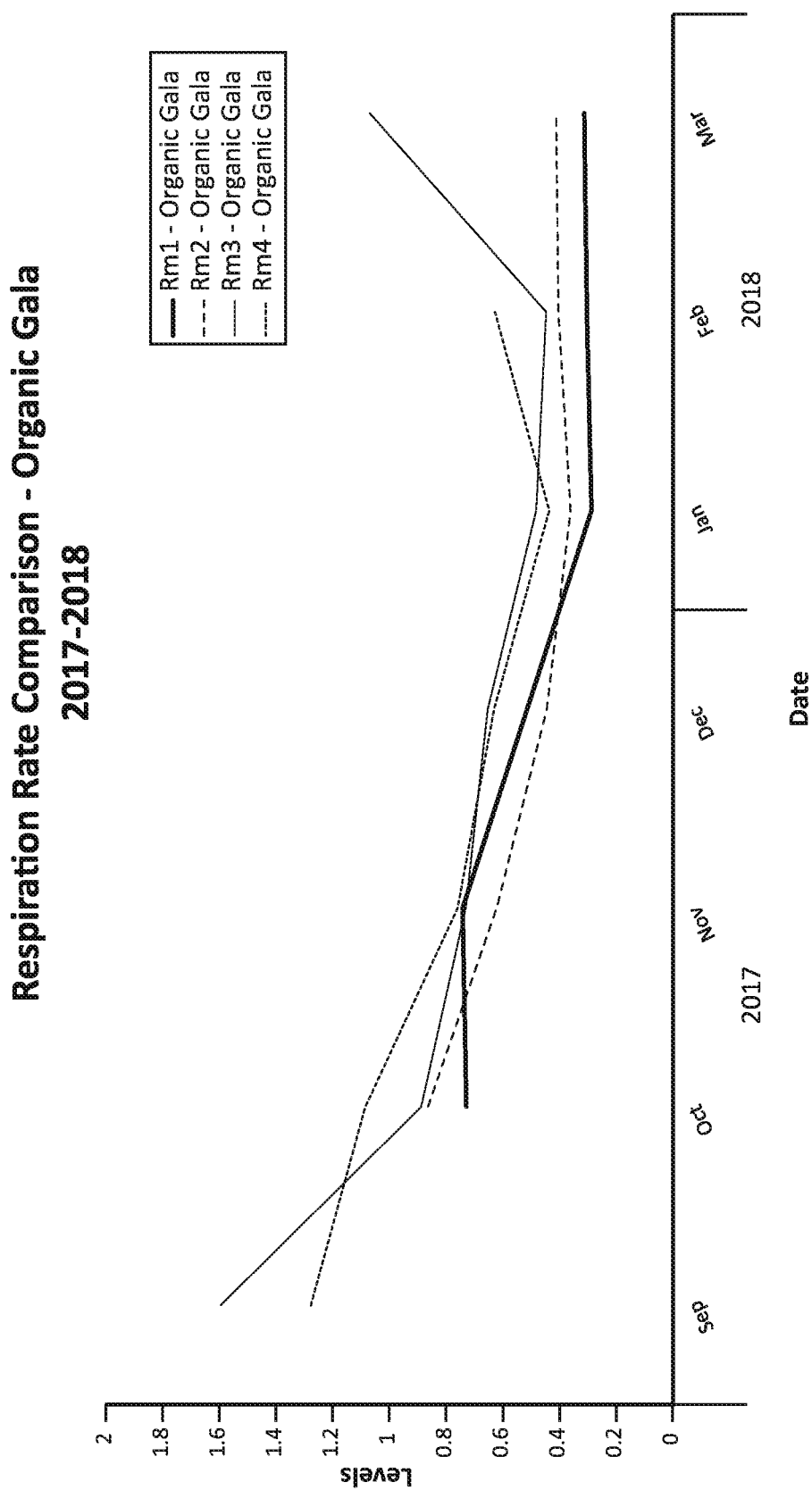
FIG. 3 is a graph of a respiratory values over time for four controlled atmosphere rooms.

As shown in FIG. 2, for example, three respiratory values are depicted for a first sampling enclosure: oxygen consumed, carbon dioxide produced, and respiration quotient. The oxygen concentration is maintained at an optimized minimal value in accordance with the disclosure of U.S. Pat. No. 8,739,694 to Schaefer. As shown in FIG. 3, one respiratory value (the respiration rate) is shown for four controlled atmosphere rooms over a seven month time period. By comparing the time rate of change of the respiration rate for the gala apples in each of the four controlled atmosphere rooms, a central controller 22 in electrical communication with each controlled atmosphere room 10 can prioritize the contents of the controlled atmosphere rooms for shipment to the customer. For example, the respiration rate of the gala apples in Room 3 of FIG. 3 includes a greater rate of change (based on successive measurements) beginning at February 2018 than does the gala apples of the remaining controlled atmosphere rooms for the same time period. Based on this data, the central controller then ranks the commodities for each controlled atmosphere room in accordance with a predetermined criteria. For example, the predetermined criteria can include shipping the produce having the longest shelf life as determined based on the time rate of change of the respiration rate, or other respiratory value. Further by example, the predetermined criteria can include shipping the produce or other horticultural commodity having the shortest shelf life or best quality as determined based on the time rate of change of the respiration rate, or other respiratory value. The predetermined criteria can be selected at the central controller 22 based on customer preferences or other values. For example, a first customer preference may include produce having a shorter shelf life, and a second customer preference may include produce having a longer shelf life. By prioritizing commodities based on detected respiratory values in accordance with customer preferences, the present system provides the more efficient allocation and delivery of commodities over known systems.

Figure 4:
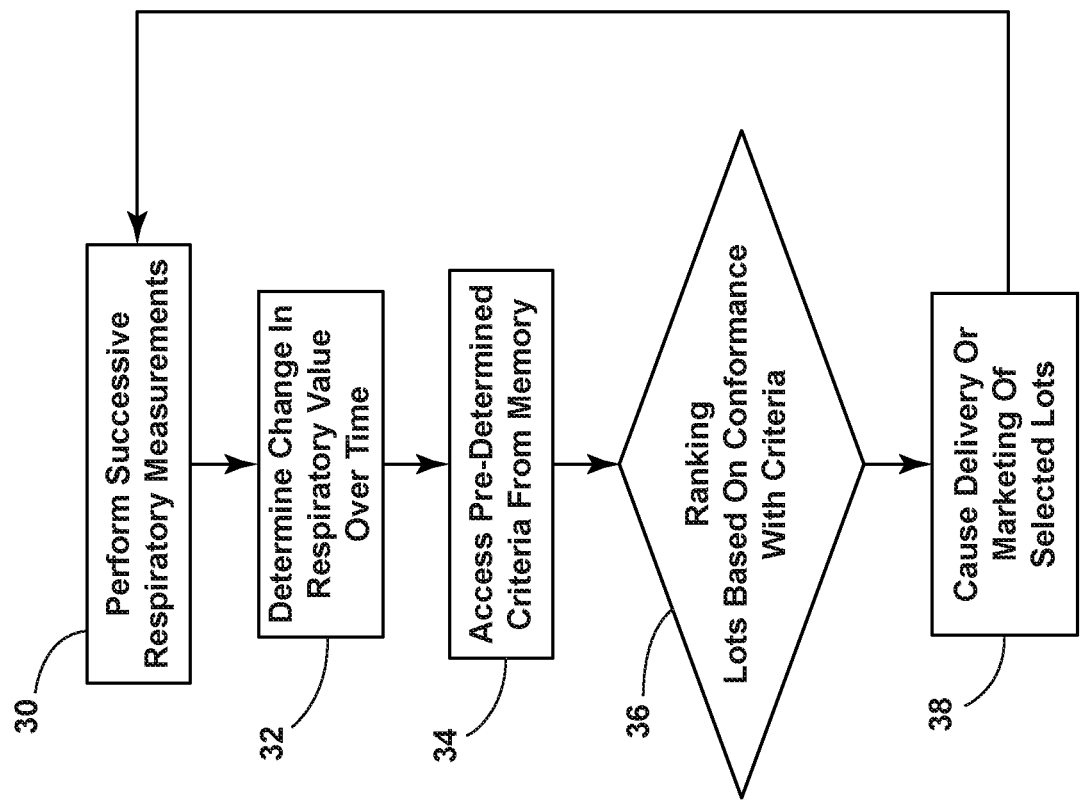
FIG. 4 is a flow chart illustrating a method for evaluating commodities based on changes in respiratory values in accordance with one embodiment.

Referring now to FIG. 4, a flow chart depicting a computer-controlled method of the present invention is illustrated. The method generally includes, at step 30, performing successive measurements of a respiratory value for a commodity in each of a plurality of enclosures. The plurality of enclosures can include a plurality of controlled atmosphere rooms, a plurality of sampling enclosures, or a combination of controlled atmosphere rooms and sampling enclosures, for example. This step is generally performed by oxygen sensors and carbon dioxide sensors in a manner that is known in the art. Other sensor include ethanol sensors and chlorophyll fluorescence sensors, for example. At step 32, the method includes determining a change in a respiratory value over time for each of the plurality of controlled atmosphere rooms. This can include a change in the time rate of change of the oxygen concentration, the time rate of change of the carbon dioxide concentration, the time rate of change of the oxygen consumed, the time rate of change of the carbon dioxide produced, the amount of carbon dioxide produced over time, the time rate of change of the respiratory quotient, the respiration rate, the time rate of change of the respiration rate, and combinations thereof. At step 34, the method includes accessing a predetermined criteria from memory, the predetermined criteria corresponding to a selected recipient or customer from among a plurality of recipients or customers. The predetermined criteria can include, for example, commodities having the shortest available shelf life, the longest available shelf life, a predetermined minimum shelf life, or a predetermined maximum shelf life. At step 36, the method further includes ranking or prioritizing the commodities from each of the plurality of controlled atmosphere rooms in accordance with the predetermined criteria. The following step 38 includes causing the sale or delivery of commodities in a prioritized manner from those controlled atmosphere rooms ranked highest according to the customer's predetermined criteria. This method is then repeated for each successive customer, each according to that customer's predetermined criteria.

While described above as relating to the change in respiratory quotient over time, the system and method can also include detecting sudden changes in respiratory values, including drops in oxygen consumed or spikes in carbon dioxide released, for example. The system and method can also include making marketing decisions based on the detected changes in accordance with predetermined criteria. Marketing decisions can include, for commodities of a given respiratory profile, targeted advertising of lots from those controlled atmosphere rooms meeting the predetermined criteria of a given customer. The method and system of the present invention therefore provide an intelligent system and method that uses changes in respiratory values to improve the evaluation and selection of commodities for sale to customers.

The above description is that of current embodiments of the invention. Various alterations and changes can be made without departing from the spirit and broader aspects of the invention. This disclosure is presented for illustrative purposes and should not be interpreted as an exhaustive description of all embodiments of the invention or to limit the scope of the claims to the specific elements illustrated or described in connection with these embodiments. Any reference to elements in the singular, for example, using the articles "a," "an," "the," or "said," is not to be construed as limiting the element to the singular. CLAIMS

The invention claimed is:

1. A system for evaluating agricultural or horticultural commodities, the system comprising:
    a plurality of storage enclosures, each comprising a controlled atmosphere room storing a bulk quantity of commodities therein;
    a plurality of sampling enclosures, wherein each of the plurality of sampling enclosures is in atmospheric communication with a corresponding one of the plurality of storage enclosures;
    a control system adapted to regulate the atmosphere within each of the plurality of storage enclosures, the control system including at least one sensor and a controller, the controller performing the following:
        causing the at least one sensor to perform a plurality of successive atmospheric measurements within each of the plurality of sampling enclosures over time, wherein, for each of the atmospheric measurements, the respective sampling enclosure is temporarily isolated from the corresponding storage enclosure,
        for each of the plurality of sampling enclosures, determining a respiration rate of commodities stored therein,
        ranking the commodities from among the plurality of storage enclosures based on the determined respiration rate,
        selecting commodities from among one of the plurality of storage enclosures based on the ranking, the selected commodities having a higher respiration rate than non-selected commodities, and
        causing delivery of the selected commodities from among the plurality of storage enclosures in response to the selecting step.

2. The system of claim 1 wherein the controller access a predetermined criteria from computer-readable memory, the predetermined criteria being associated with a selected purchasing entity from among a plurality of purchasing entities.

3. The system of claim 1 wherein each of the plurality of sampling enclosures is contained within a respective one of the plurality of storage enclosures.

4. The system of claim 1 wherein the plurality of successive atmospheric measurements within each of the plurality of sampling enclosures is performed over multiple months.

5. A system for evaluating agricultural or horticultural commodities, the system comprising:
    a plurality of storage enclosures, each comprising a controlled atmosphere room storing a bulk quantity of commodities therein;
    a plurality of sampling enclosures, wherein each of the plurality of sampling enclosures is in atmospheric communication with a corresponding one of the plurality of storage enclosures;
    a control system adapted to regulate the atmosphere within each of the plurality of enclosures, the control system including at least one sensor and a controller, the controller performing the following:
        causing the at least one sensor to perform a plurality of successive atmospheric measurements within each of the plurality of sampling enclosures over time, wherein, for each of the atmospheric measurements, the respective sampling enclosure is temporarily isolated from the corresponding storage controller,
        for each of the plurality of sampling enclosures, determining a respiration rate of commodities stored therein,
        ranking the commodities from among the plurality of storage enclosures based on the determined respiration rate, and
        selecting commodities for delivery from among one of the plurality of storage enclosures based on the ranking of the commodities, the selected commodities having a higher respiration rate than non-selected commodities.

6. The system of claim 5 wherein each of the plurality of sampling enclosures is contained within a respective one of the plurality of storage enclosures.

7. The system of claim 5 wherein the plurality of successive atmospheric measurements within each of the plurality of sampling enclosures is performed over multiple months.

\* \* \* \* \*